United States Patent
Gubenko et al.

(10) Patent No.: US 10,220,560 B2
(45) Date of Patent: Mar. 5, 2019

(54) DEVICE FOR EXTRUDING PLASTICIZED MASSES AND PLASTIC POWDERED MATERIALS

(71) Applicant: Obshchestvo s ogranichennoy otvetstvennostyu "Avtoklavy vysokogo davleniya i temperatury", Moscow (RU)

(72) Inventors: Lev Anatolyevich Gubenko, Moscow (RU); Vladimir Evseevich Perelman, Moscow (RU)

(73) Assignee: Obshchestvo s ogranichennoy otvetstvennostyu "Avtoklavy vysokogo davleniya i temperatury", Moscow (RU)

( * ) Notice: Subject to any disclaimer, the term of this patent is extended or adjusted under 35 U.S.C. 154(b) by 425 days.

(21) Appl. No.: 14/894,065

(22) PCT Filed: May 29, 2013

(86) PCT No.: PCT/RU2013/000438
§ 371 (c)(1),
(2) Date: Nov. 25, 2015

(87) PCT Pub. No.: WO2014/193260
PCT Pub. Date: Dec. 4, 2014

(65) Prior Publication Data
US 2016/0107362 A1 Apr. 21, 2016

(51) Int. Cl.
*B29C 47/12* (2006.01)
*B29C 47/00* (2006.01)
(Continued)

(52) U.S. Cl.
CPC ............ *B29C 47/12* (2013.01); *B28B 3/26* (2013.01); *B29C 47/0004* (2013.01);
(Continued)

(58) Field of Classification Search
CPC .................... B29C 47/12; B28B 3/26
(Continued)

(56) References Cited

U.S. PATENT DOCUMENTS 4,233,259 A * 11/1980 Pietratus ............... B29C 47/12
264/167
5,741,466 A * 4/1998 Bodnaras ............ B01F 5/0603
261/79.2
(Continued)

FOREIGN PATENT DOCUMENTS

DE 601582 C * 8/1934 ............. B28B 3/26
RU 2272707 C2 10/2005
(Continued)

OTHER PUBLICATIONS

Machine translation of RU 2272707, published Mar. 27, 2006.*
(Continued)

*Primary Examiner* — Jacob T Minskey
*Assistant Examiner* — Russell E Sparks
(74) *Attorney, Agent, or Firm* — Collard & Roe, P.C.

(57) ABSTRACT

A device for extruding plasticized masses and plastic powdered materials includes an extruder, a deformation element with a working channel having coaxially located profiled portions, and a forming die. The surface of each of the profiled portions includes two couples of wave-like surfaces acting in antiphase, symmetric with respect to the working channel axis and smoothly passing one into the other. The maximal increments of the distances from the channel surface to the axis thereof for one couple of these surfaces is located in a plane passing through the axis of the channel. Such maximal increments for the other couple are located in the profiled surface, the generatrices of which profiled surface are orthogonal to the axis of the channel along the
(Continued)

entire length of the same and are orthogonal to said plane at the inlet and the outlet of each profiled portion.

1 Claim, 5 Drawing Sheets

(51) Int. Cl.
| | |
|---|---|
| *B29C 47/08* | (2006.01) |
| *B28B 3/26* | (2006.01) |
| *B29K 23/00* | (2006.01) |
| *B29K 105/00* | (2006.01) |
| *B29K 509/02* | (2006.01) |

(52) U.S. Cl.
CPC ...... *B29C 47/0009* (2013.01); *B29C 47/0869* (2013.01); *B29K 2023/0683* (2013.01); *B29K 2105/0038* (2013.01); *B29K 2105/251* (2013.01); *B29K 2509/02* (2013.01)

(58) Field of Classification Search
USPC ........................................................ 264/167
See application file for complete search history.

(56) References Cited

U.S. PATENT DOCUMENTS

| | | |
|---|---|---|
| 2002/0121726 A1 | 9/2002 | Inoue et al. |
| 2006/0051448 A1 | 3/2006 | Schryver et al. |

FOREIGN PATENT DOCUMENTS

| | | |
|---|---|---|
| RU | 2330755 C2 | 8/2008 |
| RU | 2489253 C1 | 8/2013 |

OTHER PUBLICATIONS

Smooth, Definition of Smooth by Merriam-Webster Dictionary, https://www.merriam-webster.com/dictionary/smooth. (Year: 2018).*
Machine Translation of DE 601582 (Year: 1934).*
International Search Report of PCT/RU2013/000438, dated Feb. 27, 2014.

* cited by examiner

PRIOR ART

PRIOR ART

DEVICE FOR EXTRUDING PLASTICIZED MASSES AND PLASTIC POWDERED MATERIALS

BACKGROUND OF THE INVENTION

Field of the Invention

The present technical solution relates to the field of producing long, pressed blanks from powders, in particular to methods and devices for extruding plasticized and plastic powdered materials.

Prior Art

It is known a method for extruding plasticized powdered materials comprising pressing a starting blank and further forcing the same through a deformation channel containing one or more portions of a variable cross-section, the forced material in each one of said portions being submitted to two mutually orthogonal setting deformations in the directions orthogonal to the drawing up direction, and the direction of the deformations in each following portion being modified at the angle 30-90° with respect to the direction of the previous setting (Patent RU 2272707 C2, Int. C1. B28B 3/26, 2004). The present method is mainly used for producing long articles from plasticized ceramic powders.

It is known as well a device for implementing the above mentioned method, comprising an extruder, a deformation element with a working channel made as one or more profiled portions, and a forming die, in this case, the shape of the channel cross-section for each one of the profiled portions located in a plane orthogonal to its axis is modified successively in the direction of the channel outlet via transitional cross-sections of a complicated shape up to get the shape of a circle with the diameter equal to that of the circle at the inlet of the channel, the surface of each profiled portion of the working channel being made as two couples of wave-like surfaces acting in antiphase, symmetric with respect to the working channel axis and smoothly passing into each other, the maximal increments of the distances from the channel surface to the axis thereof for each couple of these surfaces being located in two mutually orthogonal planes passing by the axis of the working channel (RU patent No 2272707 C2, Int. C1. B28B 3/26, 2004).

The known technical solution shows drawbacks related to its limited use since it provides the needed quality of pressed blanks for screw presses having a screw "body" diameter that is not more than 0.5 diameter of the screw working channel. Such presses are widely used for molding articles from plasticized charges the deformation of which does not require pressures superior to 4 MPa. For materials requiring the pressure of up to 10-50 MPa for molding articles, such a method for treating a pressed material does not provide sufficient degree of deformation treatment of the blank central areas, since for extruding these materials, presses with the screw body diameter up to 0.8 diameter of the press channel are used. The use of such presses requires, for compacting the material in the central area of the blank, significantly higher degrees of drawing up the material that are not easy to achieve technically, or such degrees and procedures of its additional deformation that cannot be provided by this known solution. For presses with the same working parameters, the use of the known technical solution does not enable one to obtain extruded powdered high-quality materials (rather high density gradients in the cross-sections of the blanks and a high residual porosity in their central regions are observed). Besides, the known technical solution gives rise to a high anisotropy of the material properties in the cross-sections of the blank.

SUMMARY OF THE INVENTION

Thus, the object of the present invention is to obtain a high-density uniformly deformed material and to increase the level of mechanical properties of articles produced from the pressed blanks.

The technical result of the present invention is to increase the density, the homogeneity and the mechanical properties of the extruded material thanks to the creation in the material, during the extrusion process, of a combination of oppositely signed cyclic deformations of drawing up, shearing, torsion and of oppositely signed cyclic setting deformations directed orthogonally to the drawing up axis.

The above defined object is achieved thanks to the fact that in the method for extruding plasticized powdered materials according to the first variant, comprising pressing a starting blank from said material and forcing the same along the extrusion axis through a working channel with a variable cross-section; the material forced through the deformation channel is submitted to oppositely signed cyclic drawing up deformations and to two oppositely signed cyclic setting deformations directed orthogonally to the extrusion axis and acting in antiphase, according to the invention, for generating in the material cyclic oppositely signed shearing and torsional deformations, the maximal increments of one of these setting deformations are assigned to the material in a plane passing through the extrusion axis, and the second of these deformations at the inlet and the outlet of the working channel is orthogonal to said plane, the directions of the maximal increments of said setting during the procedure of forcing the material through the working channel being changed by turning them about the channel axis according to any smooth periodic function the period of which is equal to the length of the working channel, and the amplitude is equal to 15-75°.

The above defined object is achieved as well thanks to the fact that in the method for extruding plasticized powdered materials according to the second variant, comprising pressing a starting blank from said material and forcing the same along the extrusion axis through a working channel having several variable cross-section portions; the material forced through the working channel is submitted to oppositely signed cyclic drawing up deformations and to two oppositely signed cyclic setting deformations directed orthogonally to the extrusion axis and acting in antiphase, according to the invention, for generating in the material cyclic oppositely signed shearing and torsional deformations, the maximal increments of one of these setting deformations are assigned to the material in a plane passing through the extrusion axis, and the second of these deformations at the inlet and the outlet of the working channel is orthogonal to said plane, the directions of the maximal increments of said setting during the procedure of forcing the material through the working channel being changed by turning them about the channel axis according to any smooth periodic function the period of which is equal to the length of the respective portion of the working channel, and the amplitude is equal to 15-75°; in this case, at each following portion of the working channel, the plane in which the first of these deformations has the maximal increments is turned with respect to the similar plane of the previous portion about the extrusion axis at 30-90°.

The above defined object is achieved as well thanks to the fact that in the device for extruding plasticized powdered materials of the first variant, comprising an extruder, a deformation element with a working channel and a forming die, according to the present invention, the profiled surface of the working channel is made as two couples of wave-like surfaces acting in antiphase, symmetric with respect to the working channel axis and smoothly passing one into the other; for one couple of these surfaces, the maximal increments of the distances from the channel surface to the axis thereof are located in a plane passing through the axis of said channel, and in the other couple, such maximal increments are located in the profiled surface the generatrices of which are orthogonal to the axis of the channel along the entire length of the same and are orthogonal to said plane at the inlet and the outlet of the deformation element, the turning angle of these generatrices about the axis being described by a smooth periodic function with the amplitude 15-75°.

The above defined object is achieved as well thanks to the fact that in the device for extruding plasticized powdered materials of the second variant, comprising an extruder, a deformation element with a working channel provided with several coaxially located profiled portions, and a forming die, according to the present invention, the surface of each of the profiled portions of the working channel being made as two couples of wave-like surfaces acting in antiphase, symmetric with respect to the working channel axis and smoothly passing one into the other; for one couple of these surfaces, the maximal increments of the distances from the channel surface to the axis thereof being located in a plane passing through the axis of said channel, and for the other couple, such maximal increments being located in the profiled surface the generatrices of which are orthogonal to the axis of the channel along the entire length of the same and are orthogonal to said plane at the inlet and the outlet of each profiled portion, the turning angle of these generatrices about the axis being described by a smooth periodic function with the amplitude 15-75°, and the profiled portions of the working channel are located in a way that the plane in which the first couple of wave-like surfaces has the maximal increments of the distances from the channel surface to its axis, is turned, at each following portion of the working channel, about the working channel axis at 30-90° with respect to a similar plane of the previous portion.

The idea of the set of, claimed inventions consists in providing a simultaneous action onto the forced material with oppositely signed cyclic drawing up deformations and two oppositely signed cyclic setting deformations directed orthogonally to the extrusion axis and acting in antiphase, where, according to the present invention, the maximal increments of one of these setting deformations are assigned to the material in a plane passing by the extrusion axis, and for the second of these deformations, at the inlet and outlet portions of the working channel (or of its portion) is orthogonal to said plane, the directions of the maximal increments of this setting during the process of forcing the material through the working channel (or a portion thereof) being modified by turning them about the channel axis according to any smooth periodic function the period of which is equal to the length of the working channel, and the amplitude is equal to 15-75°, which builds in the material cyclic oppositely signed shearing and torsion strains.

In this case, the region of the treatment of the material by deformation can be conventionally divided into two portions. At the first portion of this region, the area of the cross-section of the blank is reduced at 10-40% and the material acquires a longitudinal drawing up deformation. At the second portion of the deformation treatment region, the area of the blank cross-section increases until the starting value, the material undergoing, in this area, a longitudinal setting deformation, i.e. compression along the axis. Such an action enables to carry out an oppositely signed drawing up deformation.

Besides, the material undergoes successively two setting deformations orthogonal to the drawing up axis. At the first portion of the region of the material deformation treatment, the directions of the maximal increments of one of these deformations are modified by turning the deformation directions along the working channel length about the channel axis according to a smooth periodic function with a period equal to the length of the channel at the angle 15-75°, which represents the amplitude of the same. In this case, the maximal expansion of the material resulting from the compression (setting) deformation, orthogonal to the drawing up axis happens in the plane passing by the extrusion axis and orthogonal to the initial direction of setting at this portion. The combination of oppositely signed compression deformations with the expansion deformation of the material, keeping their direction, builds additional shearing and torsion deformations the value of which depends on the value of the angle of deviation for the directions of the compression (setting) deformations.

At the second portion, the deformation of the material compression (setting of the same) in the direction orthogonal to the drawing up axis achieves the maximal value in the plane passing by the extrusion axis and in which the material expansion was controlled at the first portion, the maximal expansion at this portion being imparted to the compressed material in the directions that are orthogonal to the drawing up axis, and the angle of said directions turning about the drawing up axis along the entire length being assigned according to the second half of the period of the smooth periodic function that achieves its amplitude value at the moment of passing from the first portion of the region to the second one. Thus, at the beginning of the second portion, the direction of the maximal increment of the material expansion crosses the compression direction at the angle 15-75° and is orthogonal to the last at the end of the second portion, which generates the shearing and torsion deformations of the material in the directions opposite to the directions of said deformations at the first portion.

Such a combination of deformation actions provides increased homogeneity of the treated material structure, a lower level of its porosity and improvement of mechanical properties in articles produced from said pressed blanks.

The structural particularities of the working channel (building the profiled surface of the working channel or of a part thereof according to the second variant as two couples of wave-like surfaces acting in antiphase, symmetric with respect to the working channel axis and smoothly passing one into the other; the maximal increments of the distances from the channel surface to the axis thereof for one couple of said surfaces being located in a plane passing by the axis of said channel, and for the second couple, in a profiled surface the generatrices of which are orthogonal to the axis thereof at the inlet and the outlet from the deformation element, being orthogonal to said plane, and along the length of the channel the turning angle thereof about the axis is described by a smooth periodic function with the amplitude 15-75°) enable one to early out oppositely signed cyclic drawing up, shearing and torsion deformations, as well as oppositely signed cyclic setting deformations of the forced material in the direction orthogonal to the axis, which results in the formation of a high-density material having a uniform density in the entire volume of the articles. Thus, such a configuration of the working surface of the deformation element enables to carry out the above described combined cyclic oppositely signed deformation of the material forced through with a high efficiency.

The use of a deformation element in the second variant of the device for implementing the second variant of the method, composed of several coaxially arranged portions having profiled surfaces made in a similar way and every following one of which is turned with respect to a previous one about the working channel axis at 30-90°, enables one to repeat again and again the method of treating the material by deformations and to increase the density and the homogeneity of the mechanical properties thereof.

This variant of building a device for extruding plasticized and plastic powdered materials provides for the possibility to control the properties and the structure of the pressed material which in turn favors obtaining a higher level of the characteristics (properties) of use of articles produced from the pressed blanks.

Thus, a combination of the features described in the claimed methods and devices is aimed to improve the structure homogeneity of the material submitted to said deformations and to improve the quality of articles obtained from the pressed blanks.

BRIEF DESCRIPTION OF THE DRAWINGS

This set of these inventions is illustrated by the following drawings.

DETAILED DESCRIPTION OF THE INVENTION

Figure 1:
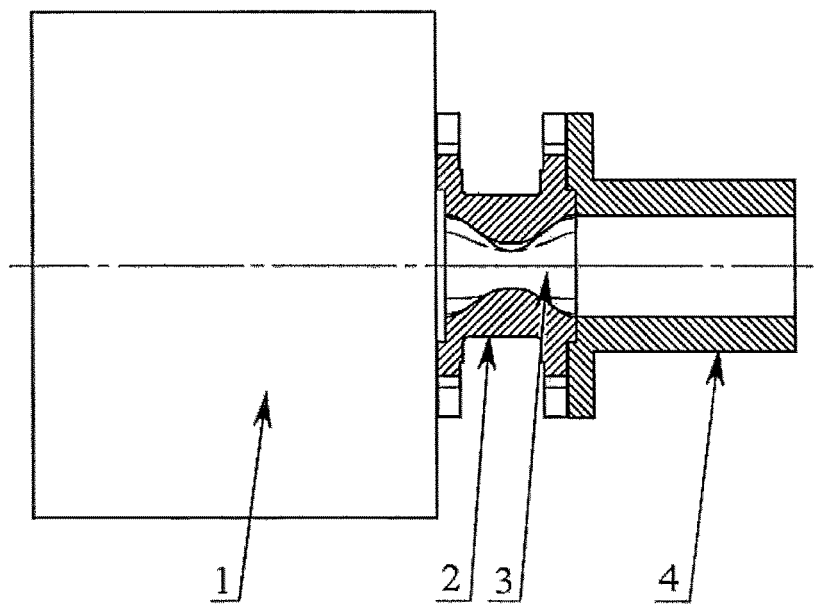
FIG. 1 shows a schematic diagram of the claimed device according to the first variant.
Figure 2:
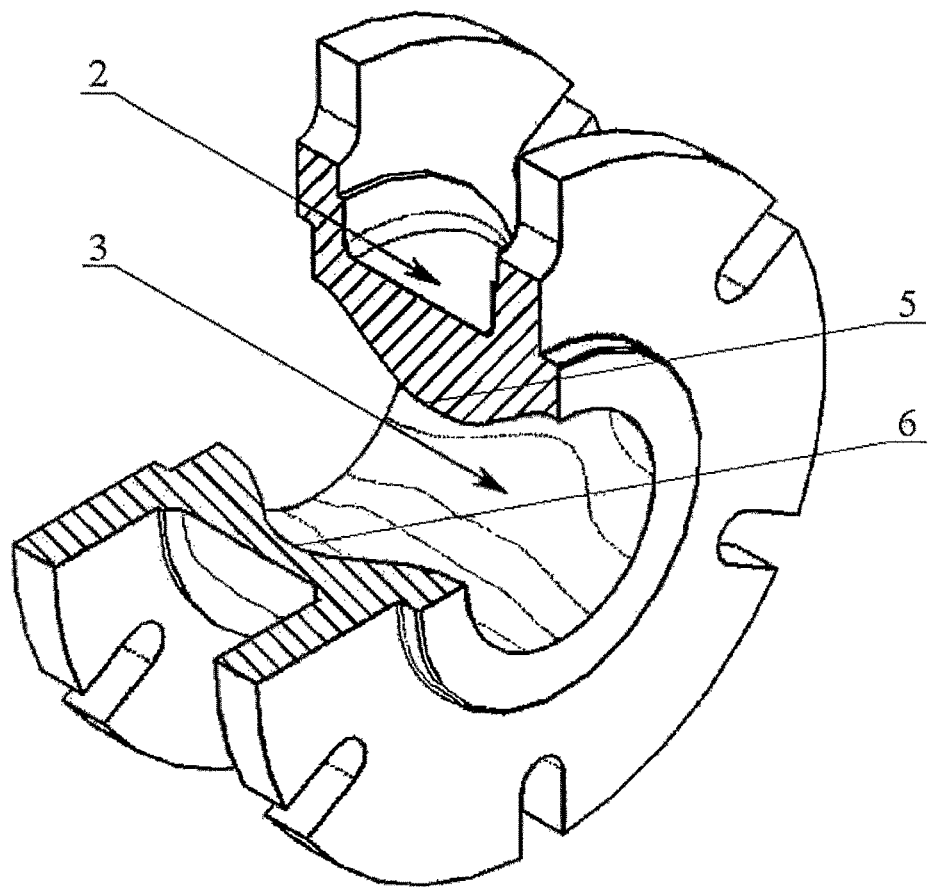
FIG. 2 shows a view of the working channel of the deformation element (in axonometry) with one profiled portion.
Figure 5:
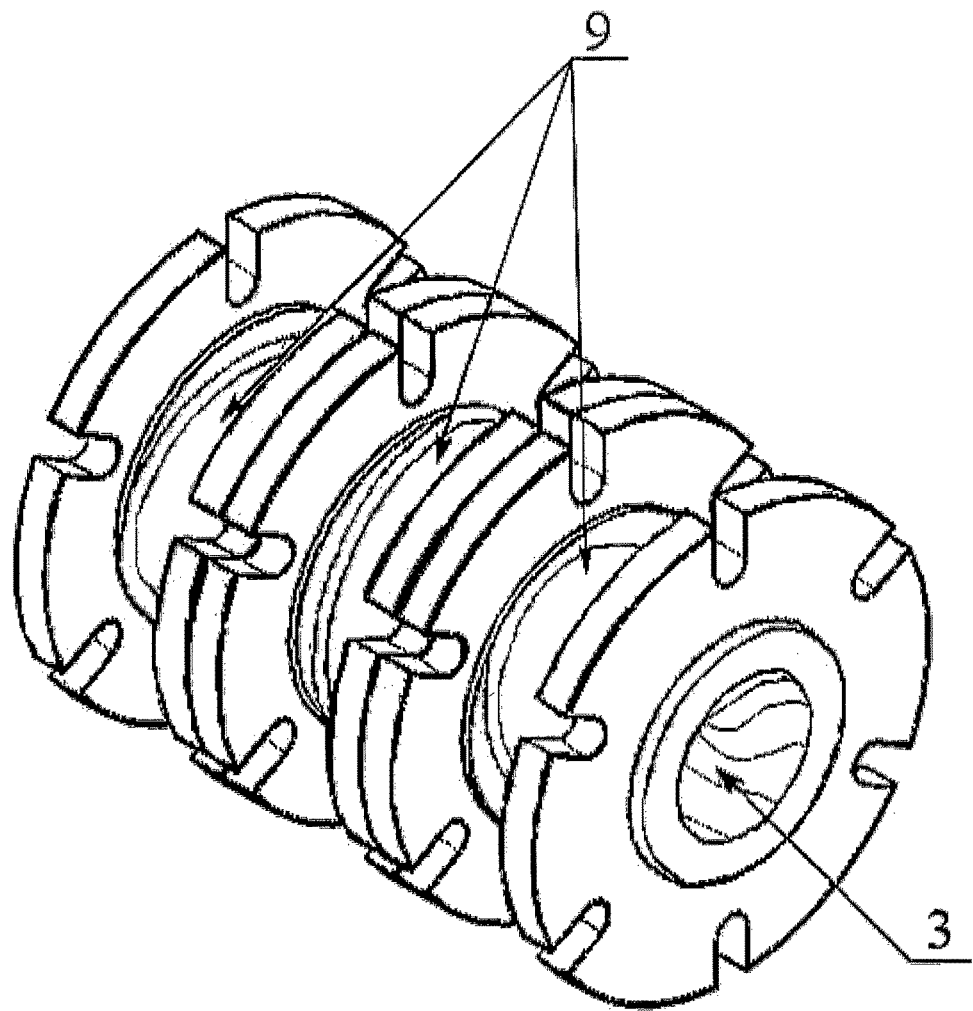
FIG. 5 shows a deformation element composed of several parts forming several profiled portions of the working channel (according to the second variant of the device)

A device for extruding plasticized powdered materials (FIG. 1) comprises an extruder 1, a deformation element 2 with a working (deformation-providing) channel 3 and a forming die 4. Besides, the working channel 3 of the deformation element 2 has one (FIG. 1) or several (FIG. 5) profiled portions. The surface of each profiled portion of the working channel 3 is made as two couples of wave-like surfaces 5 and 6 acting in antiphase, symmetric with respect to the axis of the working channel 3 and smoothly passing one into the other. In this case, for one couple of these surfaces, the maximal increments of the distances from the channel 3 surface to the axis thereof are located in the plane 7 (FIG. 3, 4) passing through the axis of said channel, and for the second couple, in the profiled surface the generatrices 8 of which are orthogonal to the axis of the channel 3, and at the inlet and outlet from the deformation element 2 they are orthogonal as well to said plane 7 passing by the axis of the channel 3. In this case, along the length of the working channel 3, the direction of said generatrices 8 changes and the turning angle thereof about the axis of the channel 3 is described by a smooth periodic function the period of which is equal to the length of the channel 3 (or to the length of the channel portion for the second variant), the amplitude being equal to 15-75°.

According to the second variant of execution of this device (see FIG. 5), the deformation element 2 is composed of several parts 9 forming coaxial portions of the working channel 3. The parts 9 are turned with respect to each other about the axis thereof, the profiled portions of the working channel being located in a way that the plane in which the first couple of wave-like surfaces has the maximal increments of the distances from the channel surface to the axis thereof is turned at 30-90° about the axis of the channel with respect to a similar plane 7 of the previous portion.

The claimed device for extruding plasticized materials operates as follows. The screw press (not shown in the drawings) supplies the volume of the material to be treated into the deformation element 2 for forcing the same through the working channel 3.

In each section orthogonal to the axis of the working channel 3 the cavity limited by the surface of the channel 3 has a shape different of the configuration of the neighboring sections. Since the mass forced through the channel fills the entire volume of the working channel 3, the travel of the same along the axis thereof results in the modifications of the shape and the area of its section. Thus, the transformation of the shape and the area of the working channel 3 section from the round one to the convexo-concave shape and reversely enables one, only by means of pushing the mass along the axis thereof, to submit it to two oppositely signed and phase-shifted cyclic deformations of setting, as well as to oppositely signed drawing up, shearing and torsion deformations.

Figure 3:
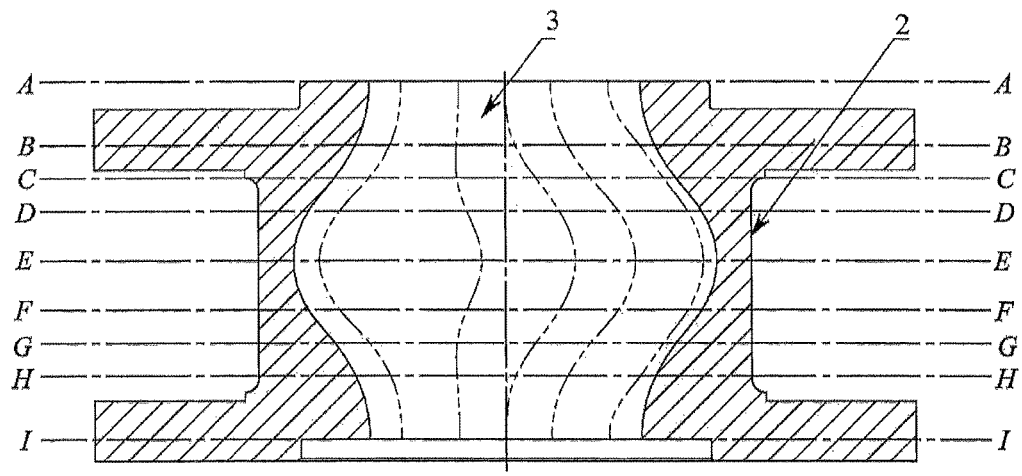
FIG. 3 shows an axial section of the deformation element with one profiled portion.
Figure 4:
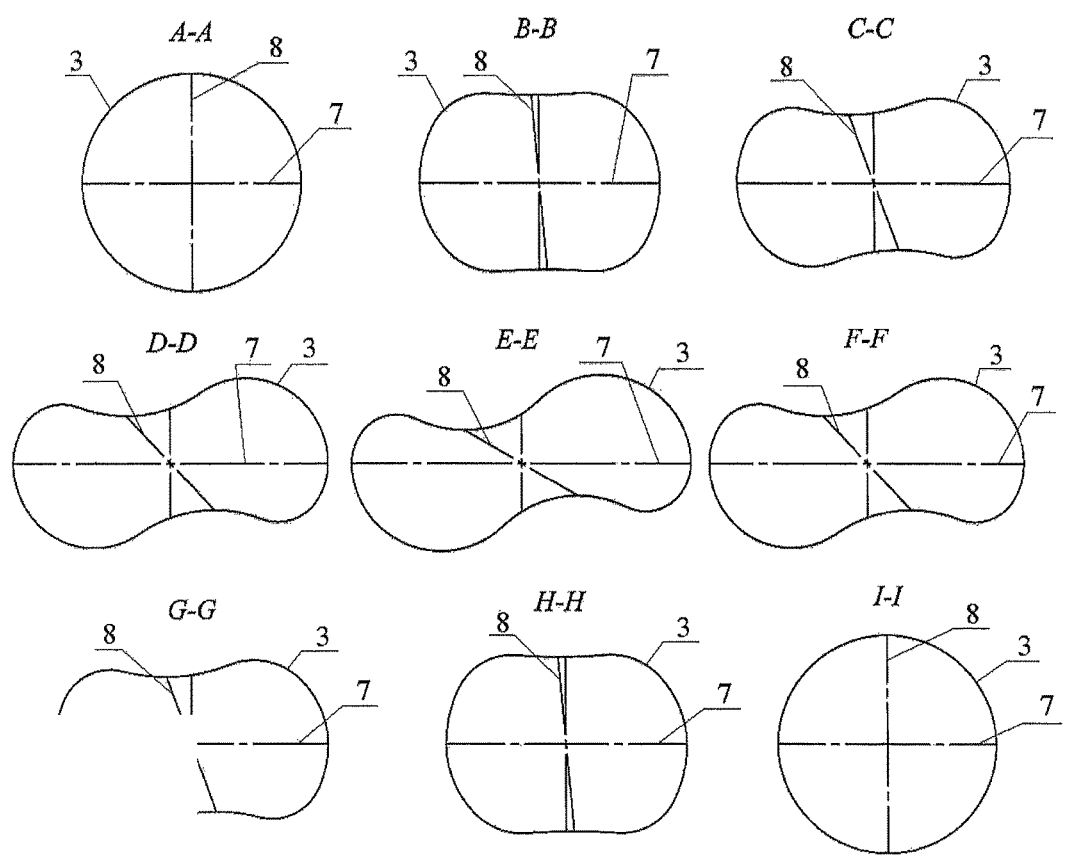
FIG. 4 shows a diagram of the modification of the configuration for the sections of the cavity of the profiled portion in the working channel along the axis thereof, as given in FIG. 3.

Besides, at the first part of the working channel (or of each profiled deformation portion of the working channel 3 according to the second variant), the convex parts of the section outline increase their size and turn, while moving along the channel 3, about the axis thereof according to the smooth periodic function with the amplitude of 15-75° with a period equal to the length of this portion, assigning the directions of compression (setting) of the material, while at the second part, they come back to the initial shape and to the starting position (FIGS. 3, 4). At the first portion of the deformation region, the maximum expansion of the mass in the course of the compression thereof, orthogonal to the axis of the channel 3, is limited by the outline formed by the intersection of the channel 3 surface with the plane 7 passing through the axis thereof. Such a combination of the changing direction of setting and of the fixed position of this plane 7 passing along the axis of the channel, as well as the modification of the position of mass centers with respect to this plane 7 induces motions of the layers of material located in the regions limited by the concave outline of the section, with respect to each other along this plane 7, as well as the turning of the extruded mass from section to section about the axis of the channel 3. In this case, the material undergoes the maximal value of the shearing and torsion deformations in the central regions of the extruded blank.

The transformation of the shape of two concave elements of the outline of the sections from symmetric ones with respect to this plane 7 to substantially asymmetric ones induces the shearing and torsion deformations in those volumes of the material that are located in these regions. The decrease of the size of the convex elements of the section, the increase of the distance between them and the return of the same to the starting position orthogonal to the above mentioned longitudinal plane 7 take place in the second part of the working channel 3. In this case, the distance from the surface of the channel 3 to the axis thereof decreases in this plane and acquires a round shape at the outlet of the working channel 3, which results, in the second portion of the deformation region, in the maximal compression of the material along this plane 7 where, at its first portion, the maximal expansion of the material was observed, the degree of the material expansion obtained thanks to said compression deformation being assigned by the modification of the size, the shape and the position of the convex elements of the section. In the end, the material undergoes a compression deformation in a new direction, and the recovery of the starting configuration of the sections of the convex elements controls the expansion of the material and leads to shearing and torsion deformations of the material mass in the directions opposite to those that they had at the first part of each profiled portion of the working channel 3.

Figure 6:
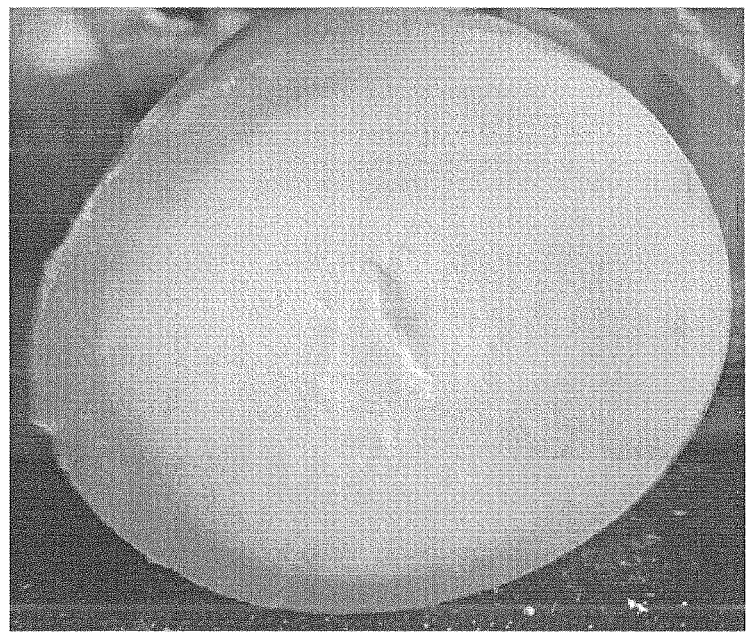
FIG. 6 shows a section of a long blank from powdered superhigh-molecular polyethylene (SHMPE) made in accordance with a known method and device.
Figure 7:
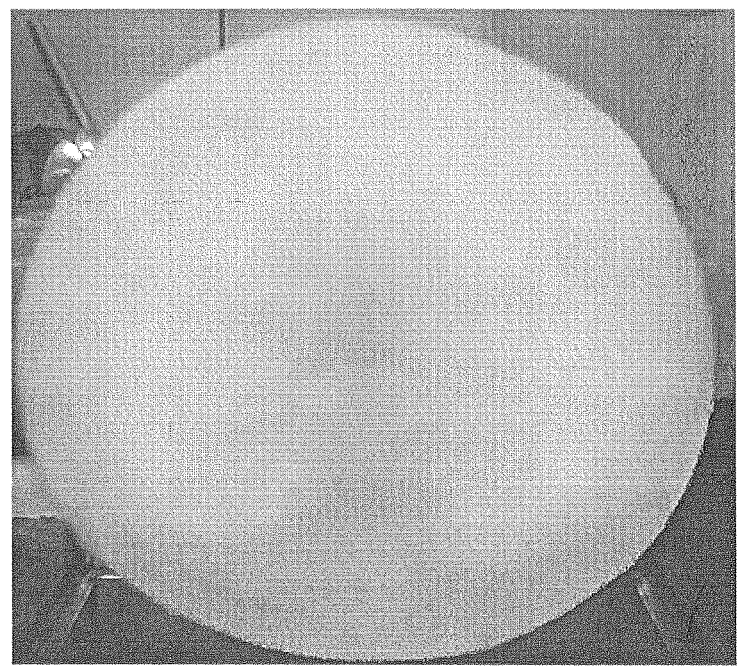
FIG. 7 shows a section of a similar blank made in accordance with the claimed method and device.
Figure 8:
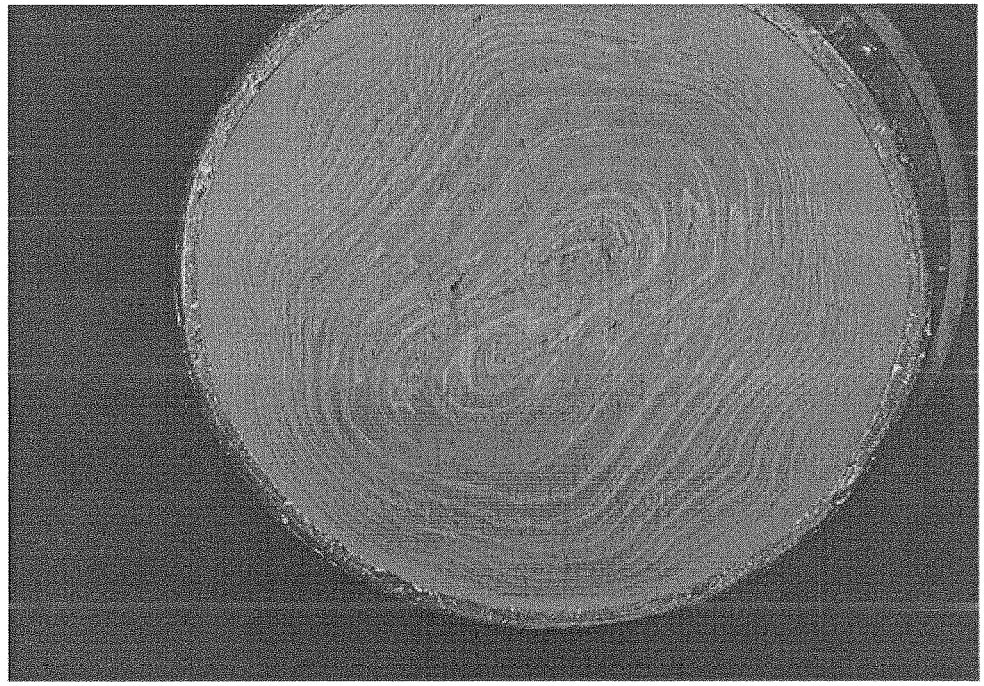
FIG. 8 shows a ceramic material obtained in accordance with a known method and device.
Figure 9:
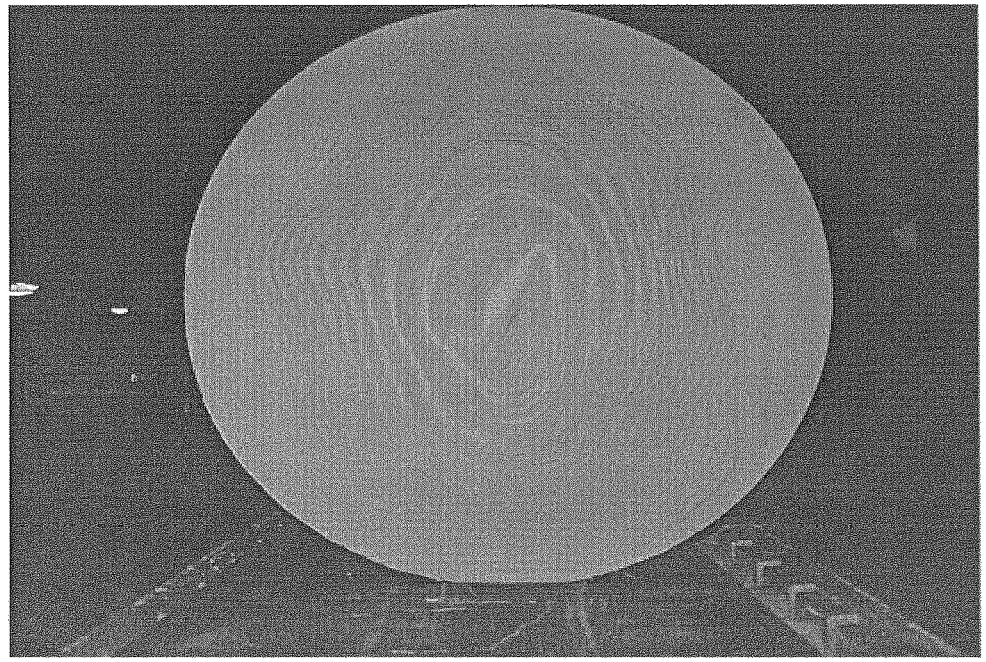
FIG. 9 shows a ceramic material obtained in accordance with the claimed method and device.

The use of the disclosed technical solution (for two variants of the method for extruding plasticized masses and plastic powdered materials and of the device for implementing same) aimed to produce long articles from plasticized masses and plastic powdered materials enabled us to significantly increase the structure density and homogeneity as well as the level of mechanical properties of the articles produced. In particular, porosity in the central regions of extruded blanks produced with the use of the claimed technical solution from coke-pitchy compositions did not exceed 0.5-1% (compared to the porosity of 10-20% observed in blanks produced with a known technical solution). Besides, we succeeded to completely eliminate any heterogeneity of the structure around the cross-section of the blanks in the material obtained even for burdens that contained coke powders with the dispersion of 2-10 μm and pitch powders with particle sizes up to 500 μm. The mechanical property level of molded blanks drawn up from said material increased on the average 2-3-fold. A similar result was achieved as well while extruding with UHMWPE (ultra-high molecular weight polyethylene) powders. The cross-section of such blanks is shown in FIGS. 6 and 7. The use of the claimed technical solution enabled us, as illustrated in FIGS. 8 and 9, to reduce the structure anisotropy in the cross-sections of extruded blanks from plasticized ceramic masses and to prevent any density difference of the material around the entire volume of the blank.

The use of the present technical solution in the manufacture of articles from UHMWPE powders and from plasticized powders of carbonic and ceramic materials enables one to obtain practically poreless and structurally homogenous large-sized extruded blanks at drawing up degrees even of the order of 2.

Thus, the use of the technical solution of the present invention makes it possible to achieve the predetermined technical result that is to increase the structure density and homogeneity in long deformed blanks from plasticized powders and to increase the level of mechanical properties and other operating characteristics of articles obtained from said pressed blanks.

The present technical solution can be successfully used as well for manufacturing long large-sized articles from other powdered materials.

The invention claimed is:

1. A device for extruding plasticized masses and plastic powdered materials, comprising:
   an extruder,
   a deformation element with a working channel having coaxially located profiled portions, and
   a forming die,
   a surface of each of the profiled portions of the working channel being made as a couple of protruding ridges having wave surfaces and a couple of grooves having wave surfaces being in antiphase, symmetric with respect to a working channel axis and smoothly joined together;
   for the couple of protruding ridges, maximal increments of distances from a working channel surface to the working channel axis being located in a plane passing through the working channel axis, and
   for the couple of grooves, similar maximal increments being located in a profiled surface having generatrices orthogonal to the working channel axis along an entire length of the working channel and orthogonal to said plane at an inlet and an outlet of each profiled portion,
   a turning angle of said generatrices about the working channel axis being described by a smooth periodic function with an amplitude of 15-75°, and
   the profiled portions of the working channel being located in a way that the plane in which the couple of protruding ridges has the maximal increments of the distances from the working channel surface to the working channel axis and is turned, at each following portion of the working channel, about the deformation channel axis at 30-90° with respect to a similar plane of a previous portion.

* * * * *